United States Patent [19]

Häfner et al.

[11] Patent Number: 4,829,962
[45] Date of Patent: May 16, 1989

[54] PROCEDURE FOR DETERMINING OPTIMUM INGNITION TIMES WITH REGARD TO ENGINE OPERATION

[75] Inventors: Günther Häfner, Stuttgart; Karl-Ernst Noreikat, Esslingen; Bernhard Bauer, Stuttgart, all of Fed. Rep. of Germany

[73] Assignee: Daimler-Benz Aktiengesellschaft, Stuttgart, Fed. Rep. of Germany

[21] Appl. No.: 630,355

[22] Filed: Jul. 16, 1984

Related U.S. Application Data

[63] Continuation of Ser. No. 371,225, Apr. 23, 1982, abandoned.

[30] Foreign Application Priority Data

Apr. 27, 1981 [DE] Fed. Rep. of Germany ....... 3116593

[51] Int. Cl.$^4$ ............................................... F02P 5/04
[52] U.S. Cl. .................................. 123/425; 123/426; 123/417
[58] Field of Search ................. 123/425, 440, 426, 417

[56] References Cited

U.S. PATENT DOCUMENTS

| 4,002,155 | 1/1977 | Harned | 123/425 |
|---|---|---|---|
| 4,130,095 | 12/1978 | Bowler | 123/440 |
| 4,200,064 | 4/1980 | Engele | 123/440 |
| 4,233,944 | 11/1980 | Omori | 123/425 |
| 4,235,204 | 11/1980 | Rice | 123/440 |
| 4,243,007 | 1/1981 | Ehrhardt | 123/425 |
| 4,245,602 | 1/1981 | Omori | 123/425 |
| 4,261,313 | 4/1981 | Iwata | 123/425 |
| 4,268,910 | 5/1981 | Omori | 123/425 |
| 4,269,154 | 5/1981 | Iwata | 123/425 |
| 4,269,155 | 5/1981 | Iwata | 123/425 |
| 4,306,529 | 12/1981 | Chiesa | 123/440 |
| 4,328,779 | 5/1982 | Hattori | 123/425 |
| 4,351,281 | 9/1982 | Geiger | 123/425 |
| 4,367,531 | 1/1983 | Furuhashi | 123/425 |
| 4,376,429 | 3/1983 | Youngblood | 123/425 |

*Primary Examiner*—Ronald B. Cox
*Attorney, Agent, or Firm*—Craig and Burns

[57] ABSTRACT

A method and system for determining optimum ignition times with regard to engine operation in which the engine is commanded, at regular, short-time intervals, to operate under conditions which cause knocking in order to be able to sense the knock limit. This is achieved, following the occurrence of a characteristic operating parameter in conjunction with a knock signal, at a frequency which is preferably significant, by storing an appropriately-corrected ignition-time value in a set of correction data, this ignition-time value lying somewhat beneath the knock limit. If the same characteristic operating parameter recurs, an optimum ignition time is accordingly indicated, which lies slightly beneath the knock limit. This procedure enables the engine to be operated under conditions which are optimum with regard to fuel consumption, without entering the knocking range with excessive frequency.

13 Claims, 2 Drawing Sheets

PROCEDURE FOR DETERMINING OPTIMUM INGNITION TIMES WITH REGARD TO ENGINE OPERATION

This is a continuation, of application Ser. No. 371,225, filed Aprl 23, 1982, now abandoned.

FIELD OF THE INVENTION

The present invention relates in general to motor vehicle engine control, and, more particularly, to a method and system for ignition timing control of an internal combustion engine.

BACKGROUND OF THE INVENTION

The invention relates to a procedure for determining optimum ignition times with regard to engine operation, especially for motor vehicles, on the basis of a basic set of performance characteristics, which were previously determined on an engine test-stand by reference to several test examples and which, under certain operating conditions, indicate optimum ignition times. During engine operation this set of performance characteristics, which is stored in an arithmetic computing unit, is called up for the purposes of setting the most favorable ignition time at any particular moment, while taking further values into consideration which are specific to the motor vehicle. These vehicle-specific values include the knock limit under particular conditions of operation of the vehicle.

In vehicle engines, low fuel consumption and the emission of clean exhaust gas are becoming ever more important requirements of engine operation. One method by which these requirements can be met comprises setting and maintaining ignition times on the engine to values which are optimum with regard to the instantaneously-changing operating conditions as they occur, this method being implemented with the aid of an electronic ignition system. However, at the same time, this means that the engine should be run as close beneath the knock limit as possible, since the ignition times which are optimum with regard to fuel consumption lie on this limit. However, in doing so, it should be ensured, as far as possible, that the knock limit is not exceeded, since there is a very great risk of damaging the engine if the knock limit is exceeded too frequently.

Since the knock limit does not, however, represent a constant limit during the long-term operation of an engine, sampling of the knock limit at definite intervals is unavoidable if its trend is to be known.

In a known procedure for determining optimum ignition times with respect to engine operation, the method followed is to use a basic set of performance characteristics which were previously assembled on the test-stand by reference to several test examples, this set of characteristics then being used to determine the ignition times for the engine. When a particular operating condition is dominant, the associated ignition time (ignition angle) is taken from the basic set of performance characteristics, and a check is made, at the same time, with the aid of a knock sensor, as to whether the engine is operating above or below the knock limit. If, together with an ignition-time value, a knock signal is generated, the ignition times are immediately adjusted, with the aid of the computing unit, to provide a certain separation of engine operation beneath the knock limit, from which point the ignition times are again gradually shifted towards the knock limit. When a knock signal occurs again, the ignition time is once again retarded, so that the knock limit is approached at regular intervals, whereupon the engine must repeatedly be forced to run with detonating combustion. This is very disadvantageous, on account of the risk associated therewith that the engine will be damaged.

BRIEF DESCRIPTION OF THE INVENTION

The object underlying the invention is consequently to provide a procedure for determining optimum ignition times with regard to engine operation, while largely avoiding detonating combustion, by means of which procedure the knock limit can be indicated even without frequent operation with detonating combustion, thus making it possible to obtain optimum engine operation in terms of fuel consumption, without at the same time having to accept the risk of damaging the engine.

The invention resides in the fact that each value from the basic set of performance characteristics, which value belongs to a characteristic operating parameter, is made available, whenever this parameter occurs, in a set of operating data, into which set of data the signals from a knock sensor are also fed, and in the fact that when these signals occur a corrected ignition-time value is stored in a set of correction data, this value being somewhat below the knock limit, and in the fact that when the same characteristic operating parameter occurs again, this corrected value is called up from the set of correction data for the purpose of determining the associated ignition time.

By means of this procedure, the advantage is obtained that a set of correciton data is generated, which data is characteristic for that particular example of the engine in that, starting from the basic set of performance characteristics, ignition-time values are stored which, with respect to the magnitude of an operating parameter at the moment in question, are somewhat below the knock limit. Thus, after once having assembled the set of correction data, running with detonating combustion thereafter occurs only if the knock limit has shifted to a specific point. By this means, operation of the engine with detonating combustion is considerably reduced, thus resulting in gentle treatment of the engine, while operation is optimum in terms of fuel consumption is guaranteed at the same time. By means of this procedure, it becomes possible to record the "mistake", made once, of operating the engine under knocking conditions, and to avoid the mistake when the same operating conditions next occur. This procedure can be carried out in a known manner, using microprocessors which can be appropriately programmed.

In an advantageous further development of the procedure, it is arranged that the corrected values are not stored in the set of correction data until the coincidence of a knock signal with a characteristic operating parameter occurs a predetermined number of times. This is advantageous because a single occurence of knocking, due to unusual conditions of some kind, while an operating parameter is dominant, is not then used immediately for updating the set of correction data, since by doing so a value might possibly be stored which would not cause knocking under normal conditions. In this context, in the case of a particular operating parameter, knocking an be regarded as occuring at a significant frequency if it occurs five times. Only when this has occurred are steps taken to modify the value in the set of correction data.

In order to assemble the basic set of performance characteristics and the set of correction data, the engine speed prevailing at a certain load is used in an advantageous manner as the characteristic parameter, a corresponding ignition time then being assigned to this speed by using the basic set of performance characteristics or, as appropriate, the set of correction data.

In a further development of the procedure, it is arranged that, before setting the ignition time associated with a characteristic operating parameter, the value taken from the basic set of performance characteristics, or from the set of correction data, is subjected to a final correction which is applied in accordance with further influence-parameters. For this correction, the air temperature, the engine temperature, the atmospheric humidity and the fuel/air ratio are called up as further influence-parameters. These further influence-parameters can be detected by means of sensors at the appropriate locations, and fed to the central processing unit. By this means, the ignition times are determined not only by reference to the load/speed graph, but also by reference to influence-parameters which are continually varying, thus enabling ignition times to be obtained which are at all times matched to the conditions which prevail in a particular case.

In a further advantageous application of the procedure, arrangements are made to detect individual cylinders affected by knocking by coordinating the ignition times with the knock signals for which cylinders the ignition time is then somewhat retarded separately from the other cylinders. This individual recording of the ignition times makes it possible to allow for wear occurring only in one cylinder by appropriately correcting the associated ignition time. By this means, it is even possible to determine, during a maintenance operation, in which cylinder a defect may possibly have occurred. This can be effected by utilizing the values which have been stored in the set of correction data.

When the set of correction data has been assembled, it is advantageous if the values stored therein are checked at definite time intervals with regard to their separation from the actual knock limit. This check is intended to detect a change in the knock limit, occurring in the course of time, to which change the correction values can then be appropriately rematched. The length of the time intervals is, however, selected so that the knocking range is not continually being entered.

These and others objects, features and advantages of the present invention will be described in more detail in the accompanying drawings with reference to an operating system for the present invention.

DESCRIPTION OF THE PREFERRED EMBODIMENT

Figure 1:
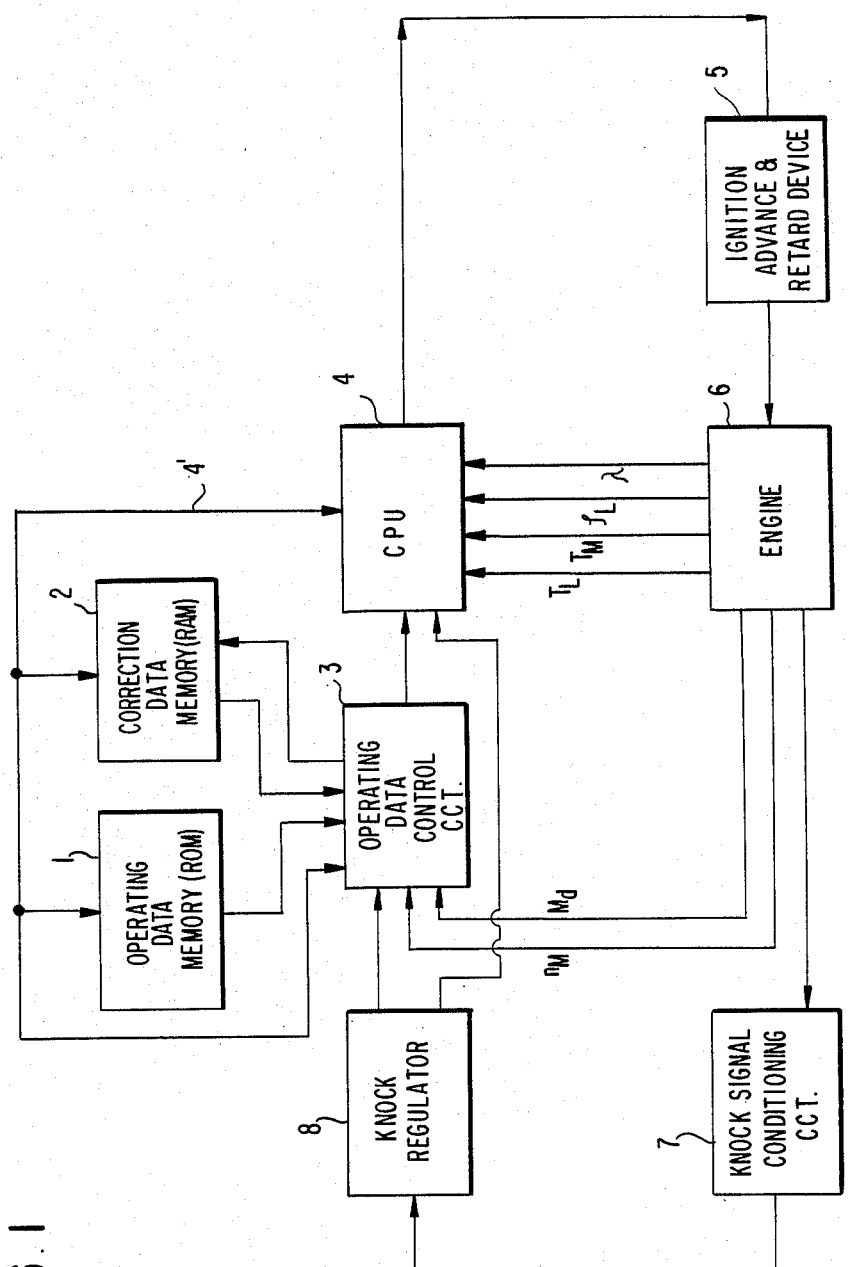
FIG. 1 is a basic block diagram of a control system for an engine of a motor vehicle embodying the features of the present invention.

First of all, a basic set of performance characteristics is assembled and stored in a memory unit 1, such as a reach only memory (ROM), which characteristics indicate ignition times of a particular engine type as a function of load and speed. This basic set of performance characteristics is determined on a test-stand, by reference to several examples of the engine, and serves as the starting point in controlling the engine in each vehicle having that corresponding type of engine. The speed $n_M$ and the load $M_d$ are now determined from suitable sensors (not shown) on the engine 6, and theses characteristic operating parameters, which indicate a certain operating condition of the engine 6, are applied to the central processing unit 4 where they are converted into memory addresses. On operating the engine 6 for the first time, the ignition time associated with a certain speed value and a certain load value is read out of the memory unit 1 on the basis of the address received from the central processing unit 4 and this value from the basic set of performance characteristics is transferred to the CPU 4 via the operating data control circuit 3. At the same time, the engine 6 is monitored for detonating combustion, with the aid of a knock sensor (not shown), and, if a knock signal is detected, it will be fed to the operating data control circuit 3 when detonating combustion occurs, via knock-signal condition unit 7 and a knock regular 8. If a knock signal of this kind is received in association with a certain speed value and a certain load value, a correction value will be determined in the operating data control circuit 3 based on the value in the basic set of performance characteristics, this correction value operating to adjust the timing signal beneath the knock limit for this characteristic operating parameter. This correction value is now stored in the correction data memory 2, from which it can once again be read out to the operating data control circuit 3 if the same characteristic operating parameter occurs again. In doing so, it is advantageous when starting to assemble the set of correction data if storage of the correction value is delayed until the coincidence of a knock signal with a particular characteristic operating parameter is detected a predetermined number of times.

If no knock signal results when a characteristic operating parameter (a certain speed and a certain load) occurs for the first time, the central processing unit will shift the ignition time towards the knock limit for this operating parameter, this being done in a stepwise manner whenever this characteristic operating parameter occurs until a knock signal is detected for the first time. The ignition-time value associated with this knock signal is then retarded by a predtermined amount so that it lies slightly beneath the knock limit, and the corresponding correction value is stored in the set of correction data in memory unit 2 if a significant relationship results between the occurrence of the knock signal and the characteristic operating parameter. For this reason, the engine 6 is repeatedly run with detonating combustion only on starting to assemble the set of correction data. However, when the set of correction ata has been assembled, this set of data is matched to the individual trend of the knock limit, in a manner such that, although operation with optimum fuel consumption can always be achieved, it is no longer necessary to run the engine 6 so that it continually enters the operating range at which knocking occurs.

The ignition-time values which are derived initially from the basic set of performance characteristics and which, after assembling the set of correction data, are adjusted on the basic of this set of data, are subjected to a final correction by the central processing unit 4, with the aid of which the ignition times are corrected with respect to various further influence-parameters. These influence-parameters can be the air temperature $T_L$, the engine temperature $T_M$, the atmospheric humidity $\phi_L$, and the fuel/air ratio $\lambda$, since these parameters likewise influence consumption-optimized operation. After applying the final correction, the ignition advance-and-retard device 5 is activated by control from the central processing unit 4, which then ensures that the engine 6 operates with optimum ignition times.

Since the knock limit does not assume a constant trend as a function of the total time for which the engine 6 has been operated, the operating data control circuit 3 operates to check the values in the set of correction data as definite time intervals under control of the central processing unit 4, this check needing to be carried out only in the case of the values which lie beneath the knock limit. If, of course, the knock limit for a certain characteristic operating parameter shifts in a manner such that the ignition-time value associated with this parameter lies above the knock limit, this is automatically detected by means of the knock sensor and an appropriate correction is applied, as desribed. If, on the other hand, the knock limit shifts in a manner such that its separation from the ignition-time value from a characteristic operating parameter becomes larger, the resulting engine operation would no longer be optimum This situation can be remedied by performing checks at definite time intervals on the separation between the ignition-time value and the knock limit. In order to do this, for a characteristic operating parameter, the corresponding value is shifted towards the knock limit, and, in particular, until detonating combustion occurs once more. The correspondence value, which is now corrected, is then stored again, just beneath the knock limit. Although this periodic checking procedure again necessitates detonating combustion for brief period, it can nevertheless be carried out at such long intervals that it cannot have any damaging effects on the serviceability of the engine.

Since each ignition time relates to a particular cylinder, it is possible, by coordinating the knock signal with the ignition time, to identify the cylinder in which the detonating combustion occurred. With the aid of the knock regulator 8 the ignition time can then be somewhat retarded, directly for this cylinder, under control of the central processing circuit 4, thus enabling the ignition time for each cylinder to be set individually.

Since the period correction of the values of the basic set of performance characteristics, and of the set of correction data, are, by means of the memory devices 1 and 2, evaluation of the set of correction data and of the basic set of performance characteristics generates, so to speak, the life history of the engine 6, so that evidence relating to events affecting the engine or to engine faults can be recovered on evaluating this data in the course of maintenance operations. The timely discovery of defects or weaknesses is rendered possible by this means.

By applying this procedure, a motor vehicle engine can be operated under conditions which are optimum with regard to fuel consumption, without running the engine too frequently with detonating combustion. The engine can therefore be treated gently.

Figure 2:
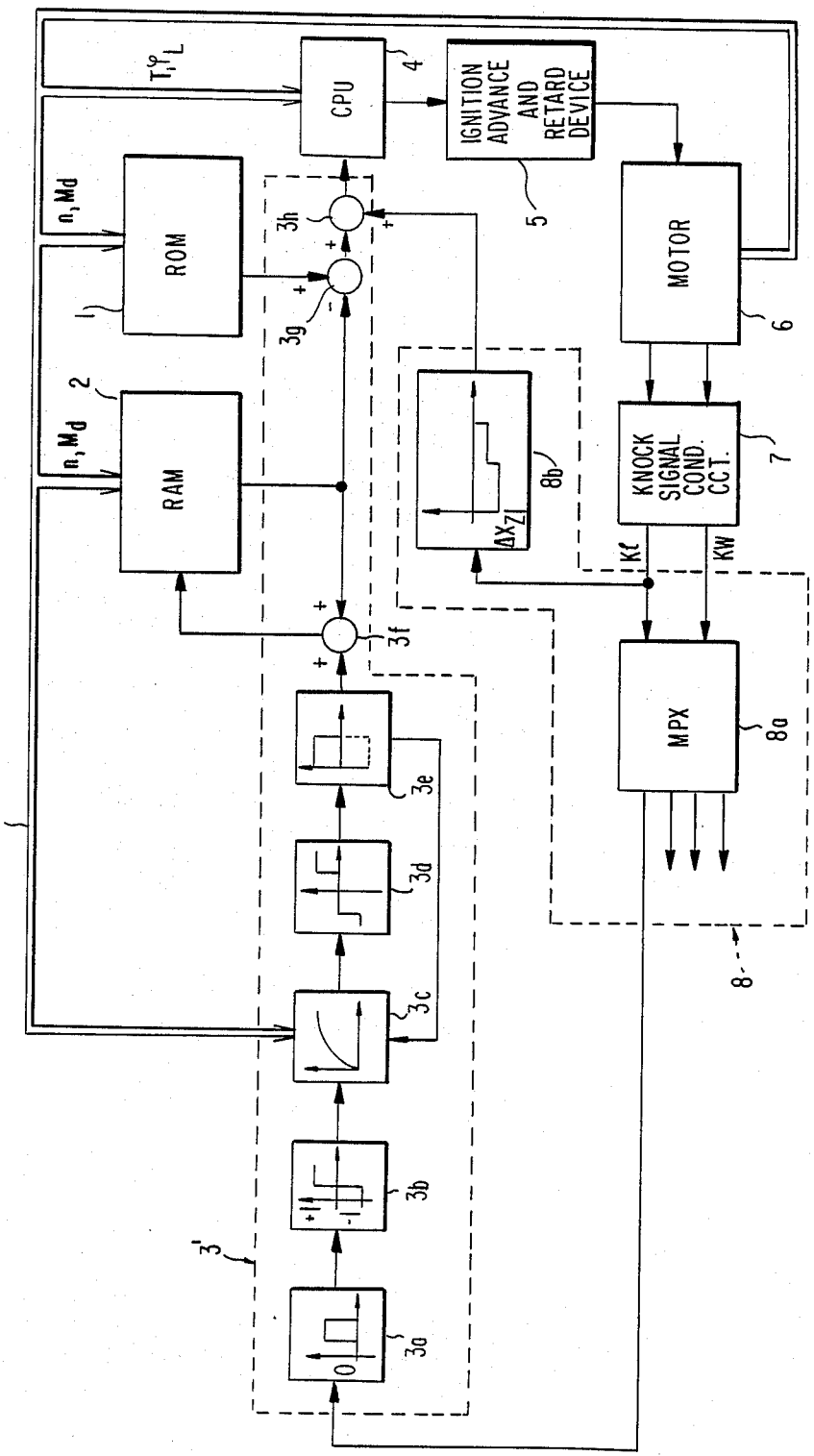
FIG. 2 is a more detailed block diagram of the sysetm of FIG. 1.

The operation of the system of FIG. 1 will be described in conjunction with FIG. 2, which illustrates in greater detail the construction of the operating data control circuit 3 and the knock regulator 8. The engine speed $n_M$ and load $M_d$ are supplied from the engine 6 to the central processing unit 4 via the processor bus 4', and the central processing unit 4 determines from these parameters the address of the storage locations in the memory units 1 and 2 which correspond to this characteristic operating parameter. This address is simultaneously applied to the memories 1 and 2 via the processor bus 4' to read out the respective ignition-time value and correction value stored at these memory locations. Initially, there will be no correction values in the memory 2, so that only an ignition-time value will be read out of the memory unit 1 through adders 3g and 3h in the operating data control circuit 3 to the central processing unit 4, which effects a final correction of this signal on the basis of the various further influence-parameters received from the engine 6. The central processing unit 4 therefore applies a final ignition-time signal to the ignition advance and retard device 5 for control of the motor operation.

If no knock signal is detected for the particular characteristic operating parameter, the central processing unit 4 will insert into the memory unit 2 at the location reserved for the particular characteristic operating parameter, as indicated by the address signals generated from the CPU a correction value which will tend to shift the ignition time towards the knock limit. As a result, as the memory units 1 and 2 are addressed from the central processing unit 4, the ignition-time value applied from the memory unit 1 to the adder 3g will be adjusted by the correction value read out of the memory 2 and also applied to the adder 3g. This process will continue in a stepwise manner with the central processing unit 4 repeatedly inserting a different correction value into the memory 2 for that particular characteristic operating parameter until a knock signal is detected for the first time.

When a knock signal is detected at the motor 6, this knock sigal K1 and the engine crankshaft-angle signal KW will be applied through the knock signal conditioning circuit 7, which is basically a pulse shaper, to a multiplexer 8a in the knock regulator 8. In addition, the knock signal K1 will be applied immediately to an adjustment-value generator 8b which will produce a signal output of predetermined incremental value to the adder 3h in the operating data control circuit 3 to immediately adjust the ignition-time value supplied to the CPU 4, causing the ignition-time value to be retarded by a predetermined amount so that it lies slightly beneath the knock limit. On the other hand, the multiplexer 8a operates to apply the knock signal K1 to one of its four output lines which corresponds to the particular cylinder which created the knock condition, as indicated by the engine crankshaft-angle signal KW. This makes it possible to adjust the timing on a cylinder-by-cylinder basis for the engine. In this regard, a separate control circuit 3' is provided for each cylinder in the operating data control circuit 3, although only one of these circuits 3' is illustrated in FIG. 2.

The knock signal K1 provided from the multiplexer 8a is the knock regulator 8 is received in the control circuit 3' at the input of a pulse shaper 3a which conditions the knock signal and applies it to the input of a bistable circuit 3b, which produces an output at value +1 upon receipt of a knock signal and an output at a value −1 if no knock signal is received. The output of the circuit 3b, which can have positive or negative values depending upon the presence or absence of receipt of a knock signal, is applied to the input of an integer 3c, which effectively integrates or counts the number of knock pulses received over a given period of time. Thus, the output of the integrator 3c is applied to a comparator 3d with the result that, if a positive or negative threshold value of the comparator 3d is exceeded by the output of the integrator 3c, an output is applied to trigger a one-shot multivibrator 3e, which produces an output of positive or negative value for a specific period of time, representing an incremental correction value.

Each time the memory unit 2 is addressed from the central processing unit 4, the output thereof is applied to one input of an adder 3f, the other input of which is supplied from the output of the one-shot multivibrator 3e. Thus, the correction value, if any, stored in the memory unit 2 for a particular characteristic operating parameter will be adjusted incrementally from the output of the adder 3f each time a predetermined number of knock signals is processed by the operating data control circuit 3. Thus, the system is capable of automatically correcting the ignition-time values stored in the memory unit 1 on the basis of the correction values stored in memory unit 2, these correction values being constantly changed and updated as knock signals are generated during operation of the engine. In addition, the central processing unit 4 is capable of periodically adjusting the correction values in the memory unit 2 for those characteristic operating parameters which are below the knock level to ensure that an optimum control of the ignition timing at a level just below the knock level is maintained at all times.

As already indicated, the integrator 3c basically operates to count the number of knock signals received during a given period of time for a given characteristic operating parameter. Thus, this integrator 3c must be reset from the output of the one-shot multivibrator 3e each time the correction value in the memory unit 2 is incremented. In addition, the integrator 3c must also be reset on transferring to another operating point or to another set of data, and this is accomplished by control from the central processing unit 4.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. A method for generating optimum ignition times for an internal combustion engine comprising the steps of:
   a. storing a basic data set of characteristic performance values determined by testing representative examples of said engine under various operating conditions to determine associated optimum ignition timing while operating under said operating conditions;
   b. detecting instantaneous values of characteristic operating parameters during operation of said engine;
   c. generating a knock signal in response to a knocking condition in the engine during operation thereof;
   d. upon a first occurrence of a detected instantaneous value, retrieving from the basis data set a specific characteristic performance value associated with the detected instantaneous value of the characteristic operating parameter;
   e. in response to said knock signal, generating and storing in a correction data set at least one correction value for each unique detected instantaneous value of said characteristic operating parameter wherein said correction value, when substituted with a characteristic performance value to control said engine, establishes engine operation at a predetermined offset below a knock limit;
   f. upon recurrence of a detected instantaneous value for which a knock signal was generated, retrieving from said correction data set a specific characteristic performance value associated with said last-mentioned detected instantaneous value;
   g. depending on said knock signal, applying an appropriate specific characteristic performance value from one of said basic and correction data sets to an operating data set; and
   h. controlling the ignition timing of said engine according to the specific characteristic performance value of said operating data set, wherein the information contained therein has been further adjusted according to air temperature, engine temperature, atmospheric humidity or fuel/air ratio.

2. A system for determining optimum ignition times for an internal combustion engine comprising:
   a. means for storing a basic data set of characteristic performance values determined by testing representative examples of said engine under various operating conditions to determine optimum ignition timing while operating under said operating conditions;
   b. means for detecting instantaneous values of characteristic operating parameters during operation of said engine;
   c. means for generating a knock signal in response to a knocking condition in the engine during operation thereof,
   d. means responsive to a first occurrence of a detected instantaneous value, for retrieving from the basic data set a specific characteristic performance value associated with the detected instantaneous value of the characteristic operating parameter;
   e. means responsive to said knock signal for generating and storing in a correction data set at least one correcting value for each unique detected instantaneous value of said characteristic operating parameter wherein said correction value, when substituted with characteristic performance value to control said engine, establishes engine operation at a predetermined offset below a knock limit;
   f. means responsive to recurrence of a detected instantaneous value for which a knock signal was generated for retrieving from said correction data set a specific characteristic performance value associated with said last-mentioned detected instantaneous value;
   g. means for applying to an operating data set a specific characteristic performance value from said correction data set during the presence of said knock signal, and for applying to said operating data set a specific characteristic performance value from said basic data set in the absence of said knock signal; and
   h. means for controlling the ignition timing of said engine according to the specific characteristic performance value of said operating data set, wherein the information contained therein has been further adjusted according to air temperature, engine temperature, atmospheric humidity or fuel/air ratio.

3. A method for generating optimum ignition times for an internal combustion engine which undergoes successive ignition cycles, which method comprises the steps of:

a. providing a permanently recorded basic data set and a writeable correction data set of ignition timing values for respective operating parameters of said engine;

b. providing an operating data set for controlling the ignition timing of said engine on the basis of information contained therein;

c. detecting instantaneous operating parameters of said engine during operation thereof to determine respective specific ignition timing values from one of said basic and correction data sets corresponding thereto;

d. generating a knock signal in response to a knock condition of the engine during operation thereof;

e. controlling the engine on the basis of information contained in the operating data set which receives an ignition timing value from one of the basic and correction data sets;

f. prior to a first ignition cycle, transferring to said operating data set an ignition timing value associated with said detected instantaneous operating parameter from said basic data set;

g. after an ignition cycle, reducing or increasing the ignition timing value in said operating data set dependent upon the presence or absence, respectively, of said knock signal and storing in the correction data set the modified timing value associated with the detected instantaneous parameters if not already stored therein; and h. prior to each succeeding ignition cycle, controlling the engine according to the same ignition timing value stored in said operating data set when no knock signal was generated during the preceding ignition cycle or, in the event of the presence of a knock signal during the preceding ignition cycle, transferring from said correction data set to said operating data set an ignition timing value associated with the detected instantaneous parameters.

4. A system for generating optimum ignition times for an internal combustion engine which undergoes successive ignition cycles, which system comprises:

a. first and second storage means for storing a basic data set and a writeable correction data of ignition timing values for respective operating parameters of the engine;

b. detecting means for detecting instantaneous operating parameters of the engine during operation thereof to determine respective specific ignition timing values from said basic or correction data set corresponding thereto;

c. knock signal means for generating a knock signal in response to a knock condition of the engine;

d. control means including an operating data set for controlling the engine, said control means further including means for receiving an ignition timing value from one of said first and second storage means;

e. means operative prior to a first ignition cycle for transferring from said basic data set to said operating data set an ignition timing value associated with said detected instantaneous operating parameter;

f. means operative after an ignition cycle for reducing or increasing the ignition timing value in said operating data set depending upon the presence or absence, respectively, of said knock signal and for generating in said correction data set a modified timing value associated with the detected instantaneous parameters if not already stored therein; and g. means operative prior to each succeeding ignition cycle for controlling the engine according to the same ignition timing value stored in said operating data set when no knock signal was generated during the preceding ignition cycle or, in the event of the presence of a knock signal duing the preceding ignition cycle, for transferring from said correcting data set to said operating data set an ignition timing value associated with the detected instantaneous parameters.

5. A method according to claim 1, wherein said step of controlling the ignition timing of the engine subsequent to the storage of correction data value includes the steps of retrieving the stored correction data value relating to the detected instantaneous value of said characteristic operating parameter, applying said correction data value to said operating data set to produce an ignition timing value, and controlling the engine ignition timing on the basis of said corrected ignition timing value.

6. A method according to claims 1, wherein said step of generating and storing correction data values includes counting the knock signals which are detected when the engine is operating at a given characteristic operating parameter, and generating a correction data value only after a predetermined number of knock signals is detected at that given characteristic operating parameter.

7. A method according to claim 6, wherein said characteristic operating parameter is based on engine speed at a certain load.

8. A method according to claim 1, wherein said step of controlling the ignition timing of the engine subsequent to the storage of correction data values includes the steps of retrieving the stored correction data value relating to the detected instantaneous value of said characteristic operating parameter, producing an ignition timing value on the basis of said retrieved correction data value, adjusting said ignition timing value in accordance with further influence-parameters relating to engine operation, and controlling the engine ignition timing on the basis of the adjusted ignition timing value.

9. A method according to claim 8, wherein said further influence-parameters include air-temperature, engine temperature, atmospheric humidity and fuel/air ratio.

10. A method according to claim 1, further including periodically adjusting selected ones of said stored correction data values in the absence of detection of a knocking signal at the related characteristic operating parameter until a knocking signal occurs, and then adjusting the selected stored correction data value to eliminate the knocking condition.

11. A system according to claim 2, wherein said means for controlling the ignition timing of the engine includes means for retrieving the stored performance characteristic value and any stored correction data value relating to the detected instantaneous value of said characteristic operating parameter, means for producing an ignition timing value on the basis of said specific characteristic performance of said operating data set, means for adjusting said ignition timing value in accordance with further influence-parameters relating to engine operation, and means for controlling the engine ignition timing on the basis of the adjusting ignition timing value.

12. A system according to claim 11, wherein said further influence-parameters include air temperature, engine temperature, atmospheric humidity and fuel/air ratio.

13. A system according to claim 1, further including means for periodically adjusting selected ones of said stored correction data values in the absence of detection of a knocking signal at the related characteristic operating parameter until a knocking signal occurs and means for adjusting the selected stored correction data value to eliminate the knocking condition.

* * * * *